United States Patent [19]

Karamian

[11] Patent Number: 4,826,575
[45] Date of Patent: May 2, 1989

[54] APPARATUS FOR PRODUCTION OF HIGH-PURITY WATER BY MICROWAVE TECHNOLOGY

[76] Inventor: Narbik A. Karamian, 7609 Exeter Rd., Bethesda, Md. 20814

[21] Appl. No.: 77,856

[22] Filed: Jul. 27, 1987

Related U.S. Application Data

[63] Continuation-in-part of Ser. No. 799,179, Nov. 18, 1985, abandoned, which is a continuation-in-part of Ser. No. 761,856, Aug. 2, 1985, which is a continuation-in-part of Ser. No. 583,894, Feb. 27, 1984, abandoned, which is a continuation-in-part of Ser. No. 393,679, Jan. 30, 1982, abandoned.

[51] Int. Cl.⁴ .............................................. B01D 3/00
[52] U.S. Cl. ..................... 202/176; 202/181; 202/186; 202/190; 202/202; 202/235; 203/1; 203/10; 203/100; 203/DIG. 2; 203/DIG. 18; 159/23; 159/DIG. 26; 159/DIG. 32; 219/10.55 D
[58] Field of Search ................. 203/1, 10, 86, 91, 100, 203/DIG. 2, DIG. 9, DIG. 18; 159/47.1, DIG. 26, 23, DIG. 32; 202/176, 267 R, 190, 181, 235, 186, 200, 202; 219/10.55 D

[56] References Cited

U.S. PATENT DOCUMENTS

| | | | |
|---|---|---|---|
| 2,446,557 | 7/1948 | Schutz et al. | 159/DIG. 26 |
| 2,483,623 | 10/1949 | Clayton | 159/DIG. 26 |
| 2,640,142 | 5/1953 | Kinn | 159/DIG. 26 |
| 2,978,562 | 4/1961 | Fox | 159/DIG. 26 |
| 3,495,648 | 2/1970 | Amadon | 159/DIG. 26 |
| 3,577,322 | 5/1971 | Nesbitt et al. | 203/100 |
| 3,607,667 | 9/1971 | Knapp | 203/100 |
| 3,907,683 | 9/1975 | Gilmont | 203/10 |
| 4,045,293 | 8/1977 | Cooksley | 203/10 |
| 4,089,749 | 5/1978 | Karamian | 202/176 |
| 4,176,267 | 11/1979 | Rueggeberg | 219/10.55 D |
| 4,182,946 | 1/1980 | Wayne et al. | 219/10.55 D |
| 4,235,677 | 11/1980 | Karamian | 202/176 |
| 4,267,026 | 5/1981 | Patel | 203/100 |
| 4,313,786 | 2/1982 | Smith | 159/DIG. 26 |
| 4,313,798 | 2/1982 | Myers, Jr. | 202/234 |
| 4,376,034 | 3/1983 | Wall | 202/234 |
| 4,406,937 | 9/1983 | Soulier | 219/10.55 D |
| 4,540,470 | 9/1985 | Wakasugi | 203/10 |

FOREIGN PATENT DOCUMENTS

| | | | |
|---|---|---|---|
| 2154201 | 5/1973 | Fed. Rep. of Germany | 203/100 |
| 3011574 | 10/1981 | Fed. Rep. of Germany | 203/10 |
| 0440770 | 1/1936 | United Kingdom | 159/DIG. 26 |

Primary Examiner—David L. Lacey
Assistant Examiner—V. Manoharan
Attorney, Agent, or Firm—Joseph P. Nigon

[57] ABSTRACT

A laboratory apparatus for continuously producing high purity distilled water includes a distillation flask, a carboy and condenser unit. A double walled microwave oven with a spacing between the walls, large enough to accommodate piping and valving means for controlling the flow of water to the distillation flask. The microwave oven supplies the heat to the system.

1 Claim, 4 Drawing Sheets

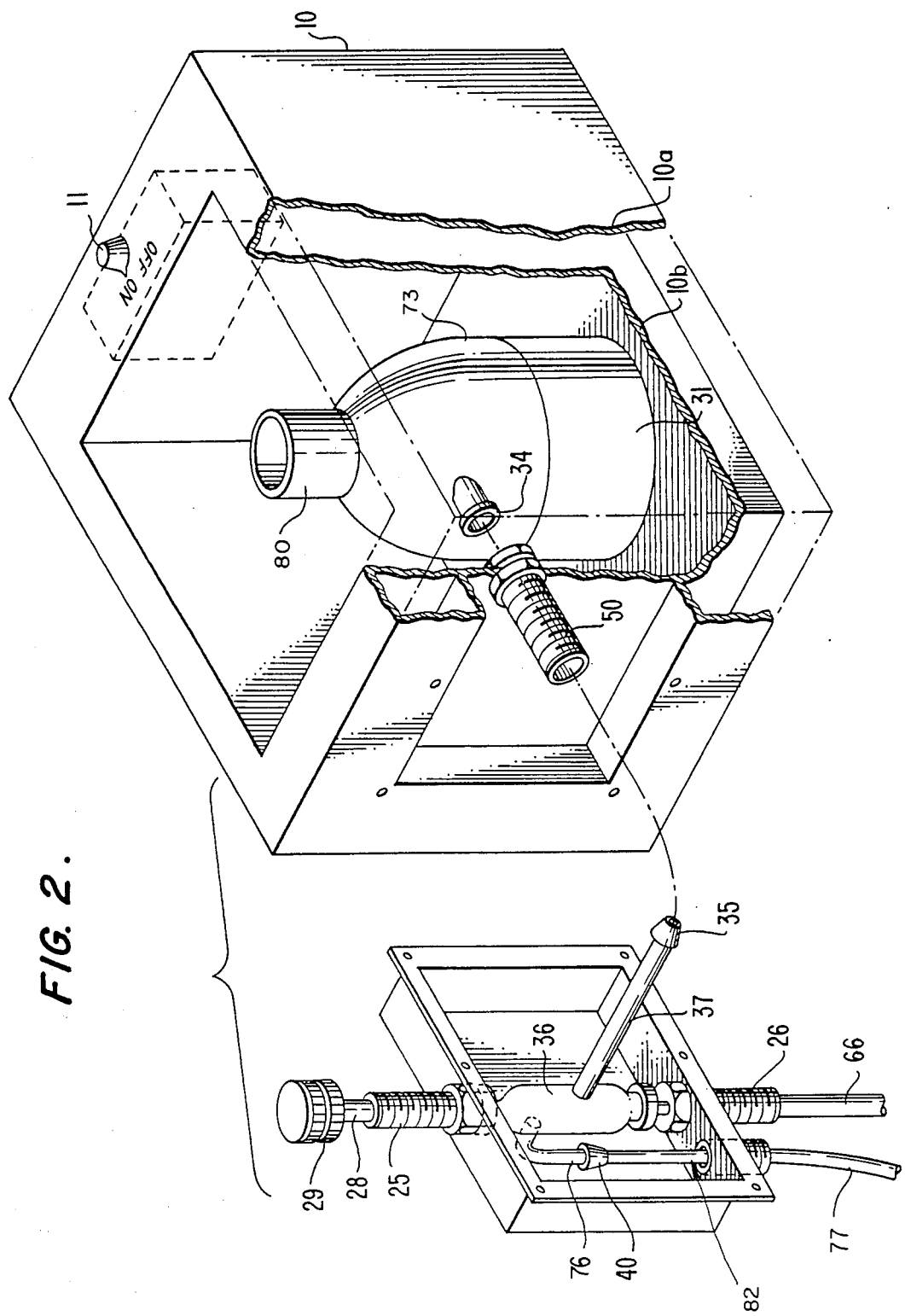

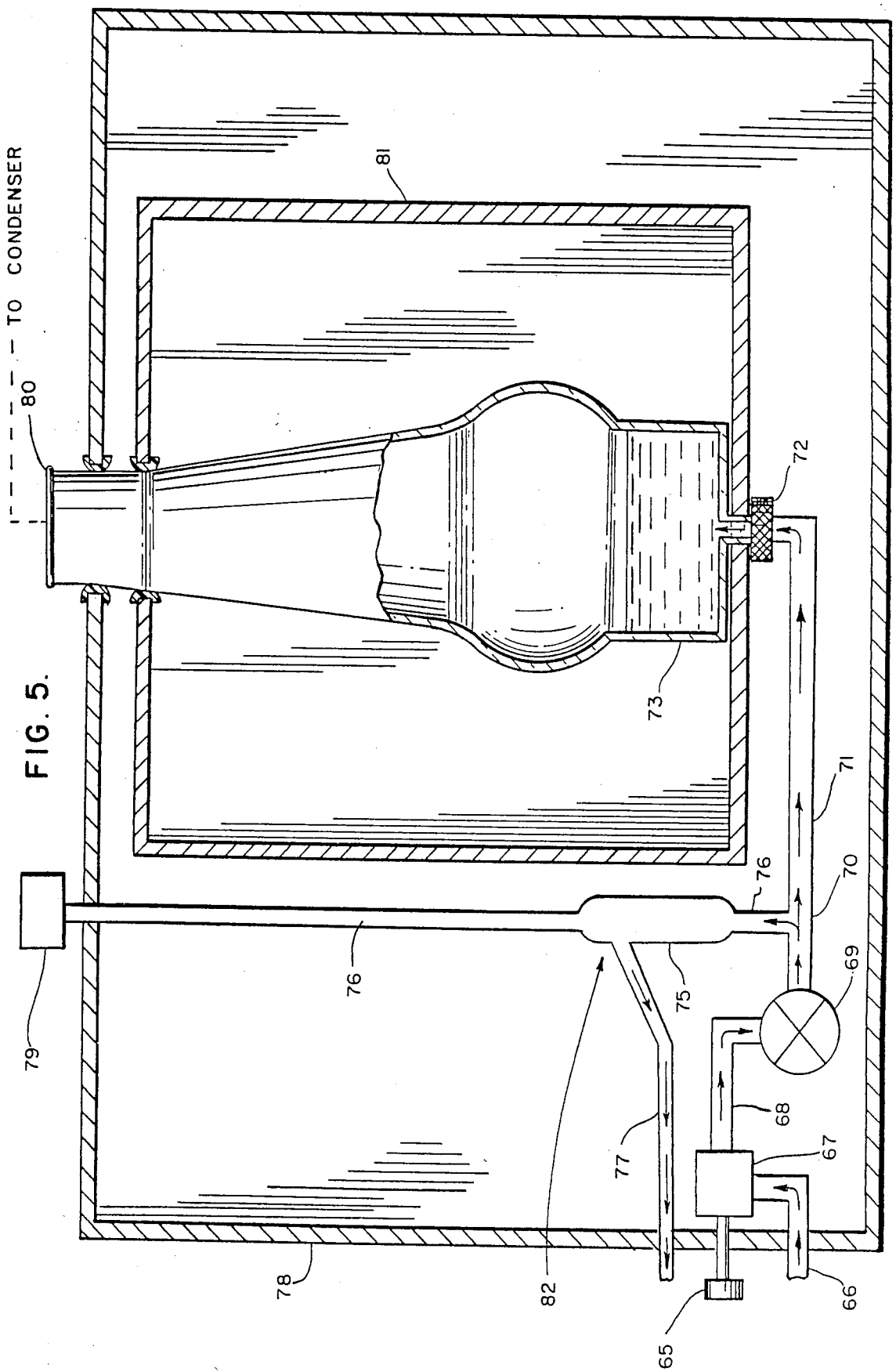

APPARATUS FOR PRODUCTION OF HIGH-PURITY WATER BY MICROWAVE TECHNOLOGY

REFERENCE TO RELATED APPLICATIONS

This application is a continuation-in-part of application Ser. No. 799,179 of Narbik A. Karamian filed Nov. 18, 1985 and entitled Method and Apparatus for Preparing High Purity Water by Microwave Technology now abandoned which is in turn a continuation-in-part of application Ser. No. 761,856 of Narbik A. Karamian, filed Aug. 2, 1985, entitled Apparatus for Preparing High Purity Water by Microwave Technology pending which in turn is a continuation-in-part of application Ser. No. 583,894 of Narbik A. Karamian, filed Feb. 27, 1984, entitled Apparatus for Preparing High Purity Water by Microwave Technology and now abandoned which is in turn a continuation-in-part of application Ser. No. 393,679 of Narbik A. Karamian, filed Jan. 30, 1982, entitled Apparatus for Preparing High Purity Water, now abandoned. The disclosure of these applications is incorporated herein by reference.

FIELD OF THE INVENTION

This invention relates to a laboratory apparatus for continuously producing high purity water and in particular an apparatus for producing high purity water by microwave technology.

BACKGROUND OF THE INVENTION

There has been a constant demand for high purity water for research and intravenous admixtures. However, it has not yet proved possible to produce water free of everything. Since the water quality requirements vary from one project to another, the tolerable level and the nature of contaminants in the water of course also vary. Therefore comprises are made with respect to the quality, and the economic requirements in order to obtain water for specific needs. The most common contaminants found in high-purity water are metalic ions, gases, organic compounds, bacteria and their by-products, endotoxins, and mycotoxins.

Ideally, distillation should give water of the highest purity, since the process of purification is merely one of adding heat to convert the water to steam and then condensing the steam to recover the water in pure form. In practice this is not the case because of the difficulties involved in producing water free of all substances.

Many are now convinced that high purity water is not only ideal to have for some research, but is absolutely essential for many biomedical experiments, especially those requiring the injection of parenteral solutions. For this reason, many laboratory distillation devices have been introduced.

Among the patents that disclose distillation apparatus are U.S. Pat. No. 2,535,807 which discloses a laboratory still for the distillation of mixtures of liquids of varying boiling points. U.S. Pat. No. 3,896,003 discloses a distillation apparatus which may be cleaned without having to be dismantled. U.S. Pat. No. 4,239,601 discloses a water distillation apparatus with a volatile pollutant removal stage. U.S. Pat. No. 3,513,076 discloses an apparatus for high purity distillation that includes a scrubber for removal of entrained liquid from the heated vapor. U.S. Pat. No. 3,849,260 discloses a water distillation apparatus that automatically drains the boiling chamber after each use. U.S. Pat. No. 4,235,677 discloses an apparatus for continuous production of high purity bacteria free and endotoxin free water.

U.S. Pat. No. 4,313,786 to Smith discloses a magnetron solvent recovery system. U.S. Pat. No. 3,495,648 to Amadon discloses a microwave apparatus for evaporating liquid mixtures and U.S. Pat. No. 2,640,142 to Kim relates to a method of heating filamentory material with microwaves. The use of microwave energy in evaporation is disclosed in U.S. Pat. No. 3,607,667.

SUMMARY OF THE INVENTION

It is an object of the present invention to provide laboratory apparatus for the production of high purity, bacteria free and endotoxin free water.

It is an additional object of the present invention to provide a laboratory apparatus for the continuous production of high purity water in a double walled microwave oven with spacing between the walls large enough to accommodate piping and valving means for controlling the flow of water to a distillation flask positioned in the microwave oven.

It is an additional object of the present invention to provide a laboratory apparatus for the continuous production and storage of high purity water in which a microwave unit with proper safeguards to prevent the escape of radiation is used for heating the water being distilled.

It is critically important that laboratory personnel be protected from microwave radiation. In the October 1980 issue of National Safety News an article by Howard Basson of the Food and Drug Administration, entitled Radio-Frequency and Microwave Radiation, sets out the FDA requirements on page 60 as follows:

> For about 10 years, the FDA microwave oven performance standard has been in effect. Because 100 per cent testing programs are required of all oven manufacturers, very few cases have existed where individual ovens have generated leakage levels of more than the maximum permissible level. The five mW/cm$^2$ maximum permissible level, measured two inches (five centimeters) from an oven's surface, is a value that must not be exceeded over the working lifetime of any oven.

The laboratory apparatus of the instant application meets these FDA requirements.

The foregoing objects as well as others which are to become apparent from the text below are achieved in accordance with the present invention in its broadest aspect by providing a laboratory apparatus for the production of high purity water, which apparatus includes a distillation flask, a condenser unit, a carboy and a microwave unit for heating to boil the water being distilled.

The carboy, flask, and condenser unit are made of borosilicate glass, quartz, Teflon or Terzel.

The microwave region of the electromagnetic spectrum may be broadly defined as that frequency range between approximately $10^9$ and $10^{12}$ cycles per second (CPS), corresponding to free-space wavelengths of the order of a few tens of centimeters to a few tenths of a millimeter. The frequencies for microwave heating come under the rules of the Federal Communications Commission which provide certain frequencies for industrial, scientific and medical uses. The frequencies are:

915 mc/sec±25 m/sec 2450 mc/sec±50 mc/sec
5800 mc/sec±75 mc/sec
22125 mc/sec±125 mc/sec
  mc=megacycles
  sec=second Of these frequencies, the first and second have been most important both in the United States and abroad.

Microwave heating is distinguised primarily by being a radiant phenomenon, differs in frequency and properties from regular heat rays. Microwave heating produces coherent wavelength in narrow bands of microwave spectrum that has volume heating property where the depth of penetration is a function of frequency. The components of a typical microwave heating system are:

A. Special oscillator tubes known as Magnetrons, Klystrons and others of this sort to generate high frequencies. The output of such tubes tend to be in the range from 1 to 10 Kilowatts or higher. The magnetrons are electron tubes made of an ordinary diode which is a vacuum tube with two electrodes, the anode and the cathode. The magnetron is a cylindrical diode with a ring of resonant cavities which act as the anode structure. A cavity in this case is a space in the tube which becomes resonant or excited in a way that makes it a source for the oscillations of microwave energy. The Klystron, among other things, differs in the method of separation of the cathode and other structure within the tube.

B. The collected electromagnetic energy is propagated from place to place in a waveguide. For example, at 2450 mc/sec, the wave guide can be a rectangular aluminum tube, 3.75×3.12 inches. At the point of use, the energy is directed into a metal enclosure space such as an oven or into a useful load such as water via helical antennas or diathermy directors.

BRIEF DESCRIPTION OF THE DRAWINGS

FIG. 2 is an exploded perspective view of the microwave cabinet with the end wall removed to show the parts of the apparatus.

FIG. 5 is a cross sectional view of the apparatus showing the preferred embodiment of the invention.

Referring now to FIG. 1, there is illustrated an apparatus for the production of high purity, bacteria free, endotoxin free water for biomedical use illustrating the microwave unit, the essential feature of the invention.

Figure 1:
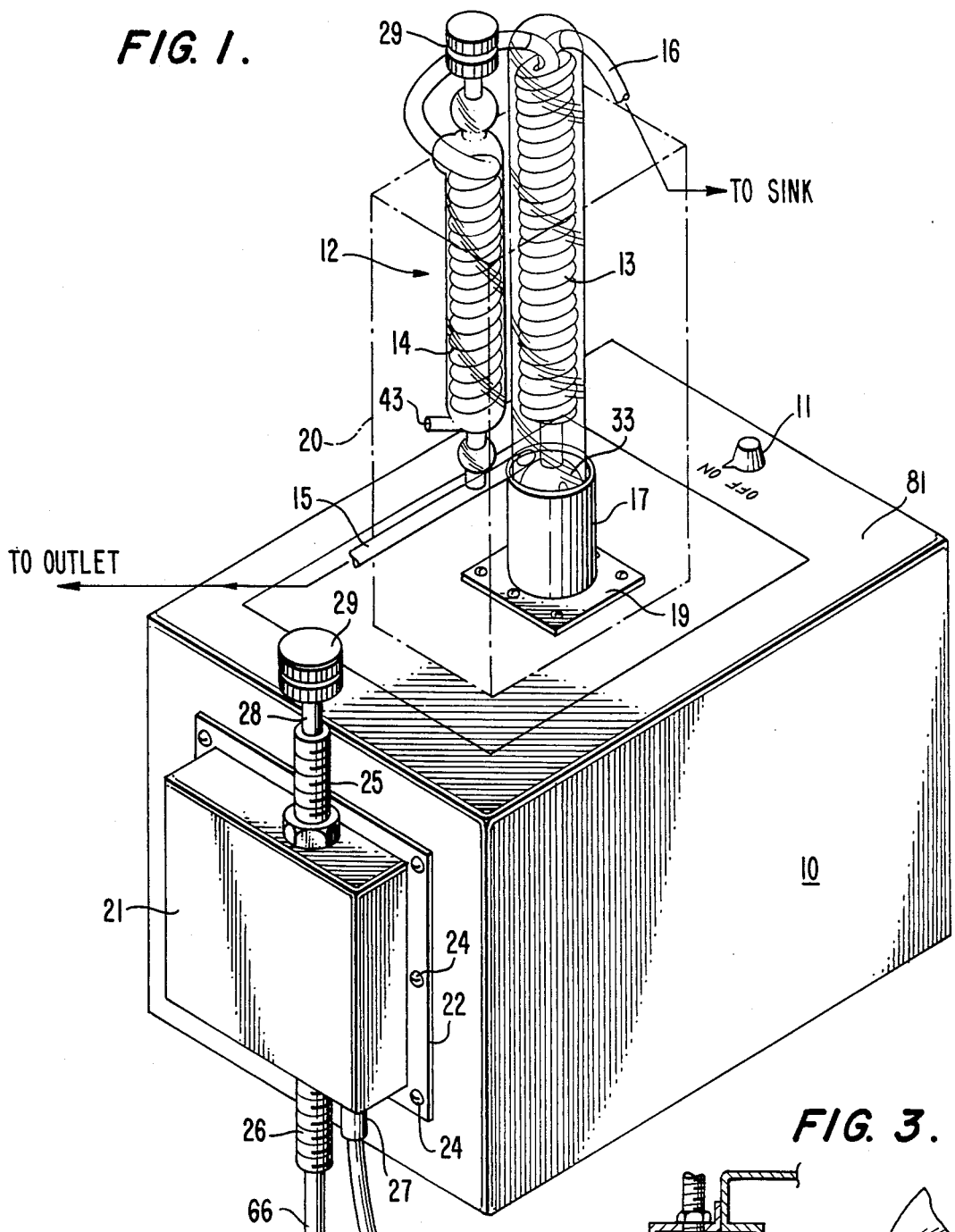
FIG. 1 is a perspective view of the laboratory apparatus.

One microwave unit which may be used is a Tappan Microwave Oven (120 volts, 60 Hz) Model 56-1026-10. The microwave unit is shown at 10 with on-off switch 11 and the condenser unit 12. The condenser unit is identical to the unit disclosed in my U.S. Pat. No. 4,235,677 which is incorporated herein by reference. The condenser unit 12 is preferably made of borosilicate glass.

The condenser unit 12 is composed of a large condenser 13 and a 200 mm long Graham condenser 14, the latter condenser which is conventional being available from any number of major laboratory glassware supply companies. The condenser 13, which is the larger of the two, is available from the Bellco Glass Inc. of 340 Udall Road, Vineland, N.J. 08360. As will be described in more detail below, the cooling water paths within the condenser 13 and the condenser 14 are connected in series. The Graham condenser 14 and the large condenser 13 have their condensed water outlets connected together, the distillate from both condensers being arranged to be fed thru the line 15 to a suitable distilled water collection unit not shown. The cooling water is fed to the condenser through the line 43 and the cooling water effluent is removed through the line 16 to a sink (not shown). The essential features of the microwave unit include a radiation impervious shield 17 attached to the top of the unit 10 as shown at 19. Further shielding is provided by a metallic mesh shield shown by the dotted lines 20.

Figure 3:
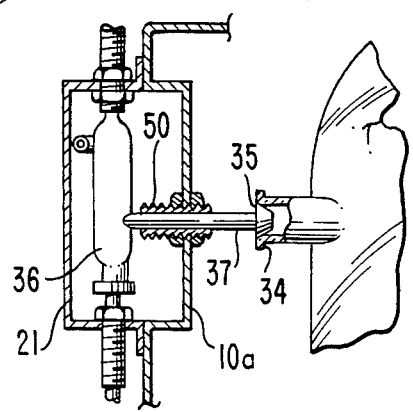
FIG. 3 is a fragmentary sectional view of the end wall showing the detail of a portion of the apparatus.
Figure 4:
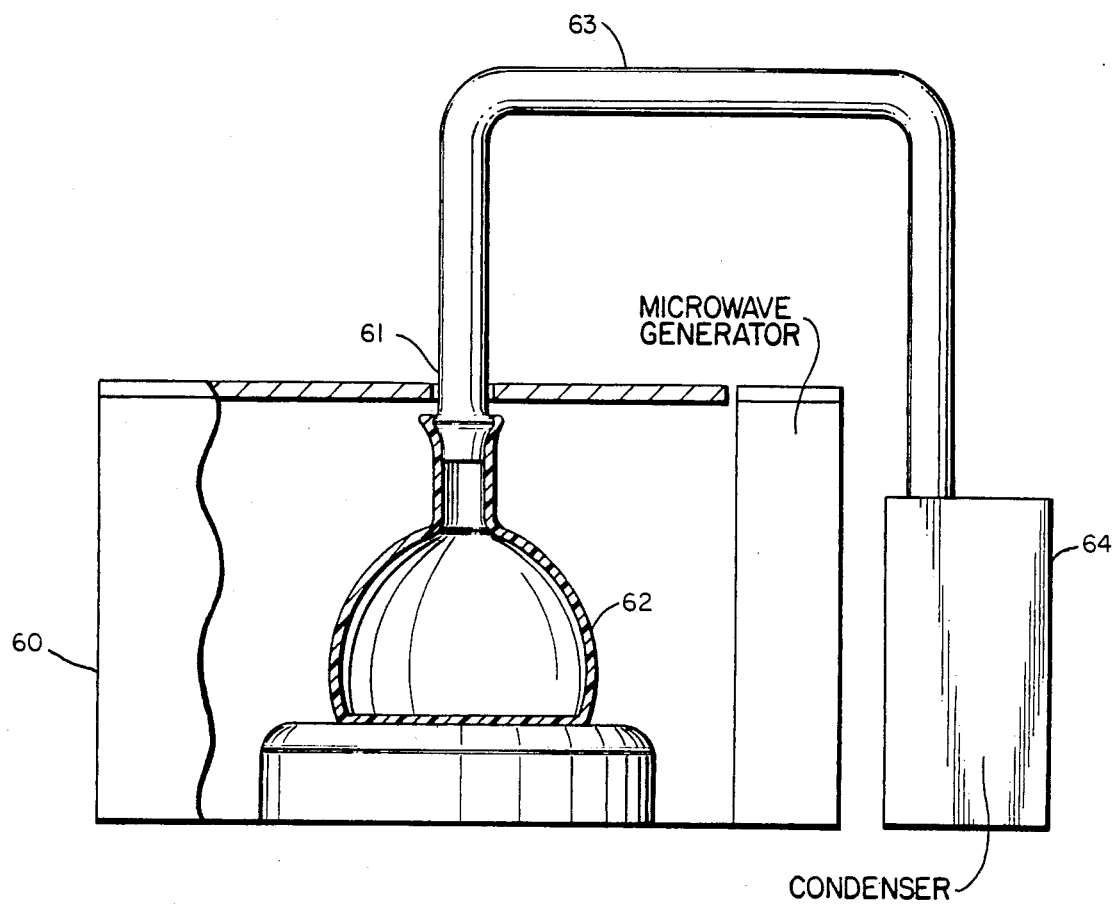
FIG. 4 is a cross sectional view of the apparatus of the prior art as described in example 1.

Attached to one side of the microwave unit 10 is a metal guard unit 21 for protecting the water feed unit shown in detail in FIGS. 2 and 3. The guard unit is attached at 22 by means of a series of sheet metal screws 24. The unit includes radiation impervious guard units 25, 26 and 27. The tubes 28 protruding from the guard unit 25 and the condenser unit 12 have filter units 29 positioned thereon. These filter units are described in detail in my U.S. Pat. No. 4,234,677. The structural features of these filters are shown in FIG. 4 of that patent. Since the '677 patent is incorporated herein by reference a discussion of these filters is not included in this application.

Referring now to FIG. 2, the details of the interior of the microwave unit 10 are shown. This unit is a Tappan Microwave Oven, identified above, modified as shown. The microwave unit 10 has double walls 10a, 10b, and is controlled by an on-off switch 11.

A distillation flask 73 made of borosilicate glass, Teflon or Terzel is positioned in the microwave unit 10 as shown. The flask may be a conventional round bottom flask supported on a suitable support 31. The flask 73 has a ground neck 80 for receiving the lower portion 33 of the condenser unit 12 (FIG. 1). The unit also includes a female ground joint 34 for receiving the male joint 35 of the feed unit 36. This unit may also be made of borosilicate glass, Teflon or Terzel. The line 37 extends from the body portion 36. The line 37 extends through the shield 50 and is connected to the distillation flask 73 through the ground joint as described in the discussion of FIG. 3 below. The unit 36 includes inlet line 66 that extends through the shield unit 26 described above. A vertical member 76 is connected to the side of the body portion 36 and is connected through a ground joint 40 to an overflow line 77 which extends through the radiation shield 27 discussed above to a sink (not shown).

Extending from the top of the body portion 36 is a line 28 that has a filter 29 attached thereto. This line 28 extends through the radiation shield 25 as discussed above.

Referring now to FIG. 3 showing a cross-sectional view of the unit 36 attached as shown in FIG. 1. The line 37 extends through the shield 50 in the side walls 10a and 10b of the microwave unit 10. The male ground joint 35 is shown positioned in the female ground joint 34 of the distillation flask 73.

In operation of the device water is fed into the distillation flask 73 through the unit 36 and any excess is removed through the overflow tube 77. The microwave unit 10 is turned on and the heated water is distilled in the conventional manner. Steam issuing from the distillation flask 73 is condensed in the condenser unit 12 and the pure water is removed through the line 15 to a suitable storage vessel.

The essential feature of the device is the inclusion of the radiation shields 17, 20, 25, 26, 27 and 50 which assure that no radiation escapes from the microwave unit while the apparatus is being operated to provide high purity bacterial free water.

Referring now to FIG. 5, which shows the preferred embodiment of the invention.

The water is fed to the system thru the water inlet 66 and flows through the valve 67 having a flow control 65 and through the conduit 68 and past the flow solenoid 69. The majority of the water moves through the conduit 71, the coupling 72 and into the distillation flask 73. A small portion of the water leaving the flow solenoid 69 is diverted through the T joint 70 to the overflow assembly 82. The overflow assembly 82 has an enlarged portion 75 which controls the water level in the distillation flask 73. An air filter 79 is positioned on the upper end of the overflow assembly 82. The excess water leaves thru overflow conduit 77. This design provides a continuous flow thru the whole system.

The boiling of the water in the flask 73 is provided by encasing the flask in a microwave chamber 81. The system is encased in a housing 78. The flask 73 has a ground joint for receiving the lower portion of the condenser unit 12 (FIG. 1).

FIG. 5 illustrates the preferred embodiment of the invention covered in the claims. In this embodiment the double walled feature of the microwave oven is utilized. The space between the housing 78 and the microwave chamber 81 accommodates the conduit and valving means for controlling the flow of water to the bottom of the flask 73.

Although double walled microwave ovens are known as shown in FIG. 1 the design of the oven to provide space between the walls for the means for feeding water to the distillation flask and for the means for controlling the level of the water in the flask has not been previously disclosed.

This system is advantageous in that the water reaches boiling temperature more rapidly. The system is also more energy efficient.

An example of utilization of this apparatus and the utilization of the apparatus of the prior art follows.

EXAMPLE I

The deficiencies of the prior art devices were shown by modifying the unit shown in the Smith U.S. Pat. No. 4,313,786. The patent states in column 1 in the paragraph beginning at line 37 "It is another objective of the invention to provide a method which can easily and safely be used by large and small manufacturers of polymer artifacts."

A Tappan microwave over (120 volts, 60 Hz) model 56-1026-10, was modified by removing a circular portion 61 from the top of the oven. A reaction vessel 62 was positioned in the microwave oven and a collection tube 63 having essentially the same external diameter as the aperture in the top of the oven was positioned therein, said collection tube had a U-shape. One end of the tube was connected to the reaction vessel 62 and the other end was connected to a condenser 64 shown in FIG. 4.

An aqueous solution was added to the reaction vessel 62 and one end of the U-shaped collection tube 63 was inserted into the reaction vessel and the other end was attached to a condenser 64.

Microwave energy was applied. The radiation escaping from the unit was measured at a distance of 2 inches and a distance of 5 inches from the top of the oven.

Measurements were made of the radiation coming from the microwave chamber in the vicinity of the region where the glass tube emerged from the oven. The detecting instrument was an Electromagnetic Monitor, Model 8100, Narda Microwave Corp., Plainview, N.Y. The probe used was Model No. 8122A. The instrument was capable of measuring radiation intensities of 0 to 200 milliwatts per square centimeter.

The following data were recorded

| Distance from Tube/Oven Interface | Intensity of Radiation |
| --- | --- |
| 2 inches | greater than 200 mW/cm$^2$ |
| 5 inches | greater than 200 mW/cm$^2$ |

It is apparent from these data that the apparatus disclosed in Smith, as modified for laboratory use, fails to meet the standards promulgated by the Food and Drug Administration set out above.

EXAMPLE II

In this example the measurements were made using an an apparatus shown in FIG. 1. The measurements were made using the same instrument used in example I.

When the measurements were made at a distance of 2 inches at the guard units designated 20, 25, 26, and 27 in FIG. 1 of the instant application readings of less than 5 milliwatts per square centimeter were recorded.

It is apparent that the laboratory apparatus of the instant invention meets the F.D.A. standards of safety.

What is claimed is:

1. An apparatus for preparing distilled water comprising in combination:
a microwave generating unit (10); a housing (78);
a distillation flask (73) positioned in a microwave chamber (81), the upper portion of said flask extending beyond the microwave chamber (81) and housing (78);
a water inlet (66) and overflow system (82) comprising in combination a T shaped conduit (70) having a horizontal member (71) and a vertical member (76) which extends from said horizontal member (71) through the top of said housing (78); a conduit (68) having a flow control valve (67), a solenoid valve 69 positioned in said horizontal member (71); a coupling (72) attaching said horizontal member (71) to an aperture in the bottom of said distillation flask (73); an overflow conduit (77) connected to the vertical member (76) and extending horizontally outward of said housing (78); an air filter (79) positioned in the top of said vertical member (76); a condenser unit (12) consisting of condensers (13) and (14); means for connecting the distillation flask (73) to said condenser unit (12); means for controlling the level of water in said distillation flask (73); a metal guard unit (21) surrounding said water inlet (66) and overflow system (82); radiation impervious shielding means (17), (25), (26), (27), and (50) for assuring that no radiation escape from the microwave unit generating unit (10) during distillation; a solid metallic radiation impervious shield (20) connected to the top of said housing and surrounding the condenser unit (12); and filter means (29) connected to the top of said condenser unit (12) and said water inlet (66).

* * * * *